United States Patent

Fowler

[11] 3,833,901

[45] Sept. 3, 1974

[54] MAGNETIC COMPASS HAVING REMOTE DIGITAL READOUT

[75] Inventor: John T. Fowler, Winthrop, Mass.

[73] Assignee: Arthur D. Little Inc., Cambridge, Mass.

[22] Filed: Aug. 28, 1972

[21] Appl. No.: 284,362

[52] U.S. Cl....... 340/347 P, 33/363 K, 340/347 DD
[51] Int. Cl. ......................... G08c 9/04, H03k 13/02
[58] Field of Search................. 340/347 P, 347 DD; 33/363 K, 363 Q

[56] References Cited
UNITED STATES PATENTS

| | | | |
|---|---|---|---|
| 2,685,054 | 7/1954 | Brenner et al. | 318/601 X |
| 2,685,084 | 7/1954 | Lippel et al. | 340/347 DD |
| 2,711,499 | 6/1955 | Lippel | 340/347 DD |
| 2,714,204 | 7/1955 | Lippel et al. | 340/347 DD |
| 3,064,889 | 11/1962 | Hupp | 340/347 DD |
| 3,349,406 | 10/1967 | Perry et al. | 33/363 K |

FOREIGN PATENTS OR APPLICATIONS 238,070  3/1960  Australia............................ 33/363 K Primary Examiner—Thomas J. Sloyan
Attorney, Agent, or Firm—Weingarten, Maxham & Schurgin

[57] ABSTRACT

A magnetic compass having a code disk disposed for rotation in accordance with compass position and which is electro-optically sensed to provide electrical output indications of compass position. A Gray-coded disk is employed having a selected code sequence to provide unambiguous transitions throughout the compass circle, and associated logic circuitry is provided to process the detected Gray code information for production of serial digital output pulses for transmission to remote receiving locations and display of compass heading.

12 Claims, 5 Drawing Figures

MAGNETIC COMPASS HAVING REMOTE DIGITAL READOUT

FIELD OF THE INVENTION

This invention relates to magnetic compasses and more particularly to a magnetic compass for providing remote digital indication of compass position.

BACKGROUND OF THE INVENTION

Magnetic compasses are known in which the angular position of the compass rotor is determined such as by electrooptical means to provide a digital signal representation of compass position which can be employed to energize a digital display. A particularly effective digital readout compass is shown in copending application Ser. No. 138,105, filed Apr. 28, 1971, and assigned to the assignee of the instant invention, wherein the compass rotor is in the form of a coded optically sensible disk having a plurality of circumferential tracks thereon, each having alternate segments of light transmissive and opaque segments of a number binarily related to those of the other tracks.

The coded disk is supported for rotation on a suitable bearing assembly and is also mounted by a gimbal structure operative to maintain substantially horizontal disposition of the disk in the presence of rolling and pitching motions of a vessel or other body on which the compass is mounted during use. One or more magnets are provided in association with the coded disk which are cooperative with the earth's magnetic field in well known fashion to provide rotation of the compass disk into a position in alignment with the magnetic north direction. An array of photosensors is provided along a radius of the coded disk with each photosensor in alignment with a respective coded track to receive light propagated therethrough by a light source provided on the opposite side of the disk.

At any angular position of the disk, the photosensor array will provide a plurality of electrical signals each of which is of a first level in response to light received from an associated track or of a second level in response to the absence of received light from an opaque portion of the associated track. A plurality of digital electrical signals is thereby produced representative of the corresponding code read from the optical disk and representative of compass position. These digital signals are processed to provide an output indication of compass heading which typically takes the form of a numerical display of heading. It is an object of the present invention to provide a compass disk of particular coded format providing unambiguous resolution of each degree heading and associated logic circuitry for processing the coded data detected from the compass disk to provide intended output indications.

SUMMARY OF THE INVENTION

In accordance with the present invention, a magnetic compass is provided in which an optically sensible compass disk is employed having a predetermined sequence of Gray coded numbers providing single bit transitions between each number around the complete compass circle, and logic circuitry for converting the detected Gray code into binary form for decoding of compass position and energization of a numerical display or other utilization apparatus. Data can be provided on a single output line for ready transmission to remote receiving sites. Briefly, the compass includes, in typical embodiment, a disk of light transmissive material supported for rotation within a gimballed compass housing and containing on a surface thereof a plurality of concentric circumferential tracks of alternately light transmissive and opaque segments each code track contains a number of segments binarily related to adjacent tracks such that each track represents one bit of a multiple bit code. A Gray code is employed having a sequence of code values such that transitions between the Gray code equivalents of adjacent degree positions are accomplished with only a single bit change in the code detected from the disk.

The digital signals provided by the photosensor array are also in Gray coded format and are converted to binary form for subsequent processing; however, the most significant bit of the Gray code detected from the compass disk is effectively inverted prior to binary conversion, which inversion offers an efficient means of transforming the detected Gray coded data into a format for subsequent processing and display. The inversion of the most significant bit of the detected Gray code provides a code which is the complement of the equivalent binary number of the detected Gray code. This converted binary number is employed to preset a unidirectional binary counter which is operative under the government of a system clock to count to a predetermined final count which is detected by an associated decoder circuit. The decoder circuit, upon detection of the final count, provides an output signal to the system clock to cause discontinuance of the clock pulses. These pulses provided by the system clock serve as the serial output signal for driving a numerical display or other utilization apparatus.

DESCRIPTION OF THE DRAWINGS

The invention will be more fully understood from the following detailed description taken in conjunction with the accompanying drawings in which.

DETAILED DESCRIPTION OF THE INVENTION

Figure 1:
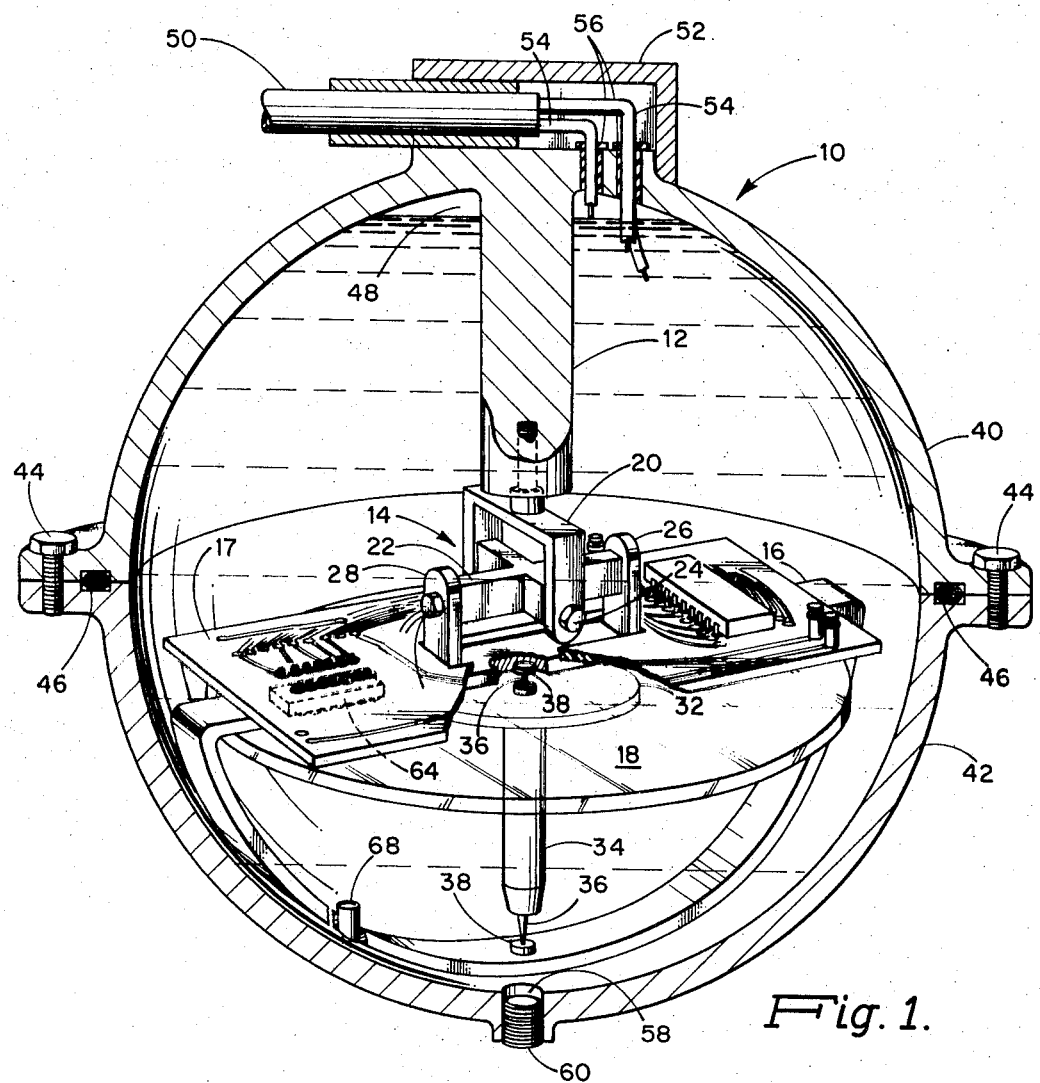
FIG. 1 is a cutaway pictorial view of a digital readout compass according to the invention.

A compass structure for providing a plurality of digital signals processed in accordance with the invention to provide a digital output indication of compass position is shown in FIG. 1. The compass structure includes a spherical housing 10 having a post 12 provided at the top portion thereof and depending from the top portion of the housing into the housing interior. The lower end of post 12 supports a gimbal assembly 14 which, in turn, supports a frame 16 on which an optically sensible code disk 18 is mounted for rotation. The gimbal assembly 14 includes a generally U-shaped member 20 fastened as shown to the bottom end of post 12. A gimbal 22 is typically supported on the member 20 by means of pins 24 which define a first axis about which gimbal 22 is rotatable. The frame 16 has upstanding flange portions 26 and 28 which are pivotally supported on gimbal 22 by respective pins 30 which define a second axis orthogonal to the axis defined by pins 24 about which frame 16 and the associated code disk 18 are rotatable. Thus, the compass disk is mounted to maintain a substantially horizontal alignment in the presence of motion of housing 10 around the mutually orthogonal axes defined by the gimbal assembly such as caused by the rolling and pitching motion of a ship in which the compass is mounted.

A cylindrical magnet 32 is centrally disposed on the bottom surface of disk 18 having a magnetic axis aligned along the north-south diameter thereof, and the disk and associated magnet are affixed to a post 34 having upper and lower pivot pins 36 supported for rotation by respective bearings 38 provided in frame 16. The magnetic axis of magnet 32 is aligned with the north-south diameter of disk 18 and is rotatable with the disk about pivots 36 to a position in alignment with the earth's magnetic field. One or more bar magnets could alternatively be employed in place of the cylindrical magnet shown.

The housing 10 is typically formed as two hemispheres 40 and 42 which are joined by mating peripheral flanges secured together around the circumference of the sphere by suitable fasteners 44. An O-ring 46 or other sealing element can be provided within a channel formed in the confronting surfaces of the housing sections to prevent leakage of damping liquid contained within the housing. The housing 10 is substantially filled with a liquid such as water or alcohol for providing fluid damping of the compass structure contained therein, and it will be appreciated that the compass card as well as the gimbal assembly are both subject to the damping action of the containing liquid. The damping liquid fills the interior of housing 10 with a sufficient air space 48 provided to accommodate expansion of the damping liquid caused by thermal variations. Electrical connection is made by a cable 50 sealingly engaged by a receptable 52 provided on the upper portion of housing 10, the leads 54 of cable 50 being coupled to the interior of housing 10 by means of respective terminal posts 56 each of which is in fluid sealing relationship with the housing wall. The housing is filled with liquid through a port 58 provided in the bottom section of housing 10 and sealed by a plug 60.

Figure 2:
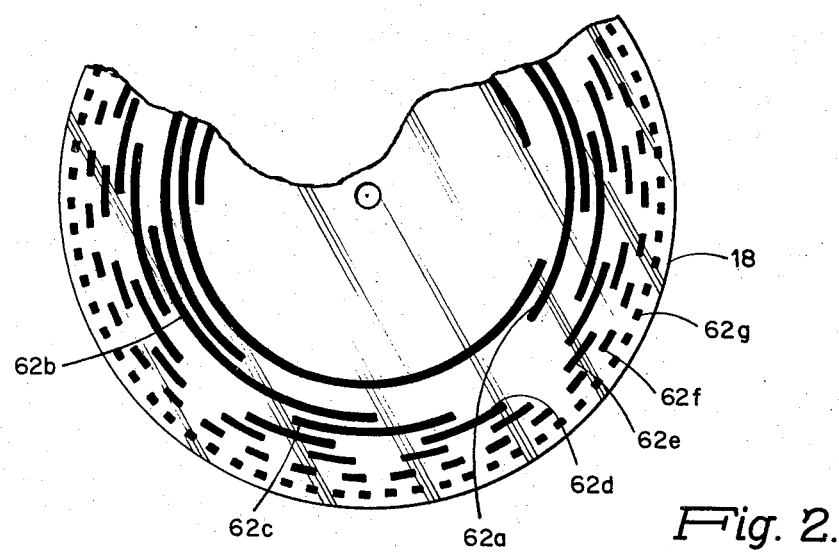
FIG. 2 is a diagrammatic representation of a coded compass disk embodied in the invention.

The disk 18 is shown more fully in FIG. 2 and is of light transmissive material such as plastic or glass and has a plurality of concentric tracks thereon, each track having a different predetermined number of alternately light transmissive and opaque segments. Each track is coded to represent one bit of a multiple bit code which according to the invention is a Gray code having a sequence of code values such that transitions between each Gray code equivalent of the compass degree headings is accomplished with only a single bit change between each degree position. In the disk illustrated in FIG. 2, nine concentric tracks 62a–62i are employed to achieve a resolution of one degree. The innermost track 62a contains one opaque segment which extends around 180° of that track, the other 180° segment being light transmissive, this track forming the most significant bit of the multiple bit code. The tracks 62b–62i formed on respectively larger radii of disk 18 contain successively greater numbers of coded segments representing the additional bits of the Gray code. The code disk itself is well known in the optical angle encoder art and need not be described in greater detail herein.

Referring again to FIG. 1 an elongated photosensor array 64 is supported on frame 16 in a position which extends along a radius of disk 18 and having a plurality of photosensitive cells 66 each of which is in light receiving relationship with a respective concentric track of disk 18. A light source 68 which typically can be a light emitting diode is supported by frame 16 in a position confronting the opposite surface of the disk as that confronting the photosensor array 64 and operative to transmit light through the coded tracks of disk 18 for receipt by respective photocells 66. Each photocell 66 will provide an output signal of one value in the presence of light received from a confronting track of disk 18 and of a second value in response to the absence of light received from the associated track. Thus the photosensor array 64 provides a plurality of digital signals representative of the Gray code sensed at a particular angular position of disk 18. These digital signals are processed according to the invention by logic circuitry to be desscribed to provide an output indication of compass position.

The compass is installed at any suitable position in the vessel or body in which it is operative; for shipboard use, the compass is usually installed at a position along or parallel to the longitudinal axis of the ship. The compass is angularly disposed with the photosensor array in alignment with the longitudinal axis to sense the code disk and provide output indications of heading with respect to magnetic north. The logic circuitry for processing the digital signals provided by the photosensor array is typically of integrated circuit form and can be contained within the compass housing 10, such as on a circuit board 17 provided on frame 16, or can be external to housing 10. Mounting of the circuitry within the housing is preferable in order to eliminate the necessity of coupling each of the photocells of the array to an external circuit by a group of wires.

The output signal representing compass position can be provided on a single data line and thus the compass is easily coupled to remote display and other utilization apparatus. More than one digital output display or other utilization means can also be provided for energization by a single compass. The compass structure itself is not visually read and can therefore be mounted at locations remote from the user and which would otherwise be unsuitable for conventional visually read compasses. Since both the compass disk and gimbal assembly are fluid damped, the compass can be located even at positions aboard a ship in which rolling, pitching and yawing motions are exaggerated.

Figure 3:
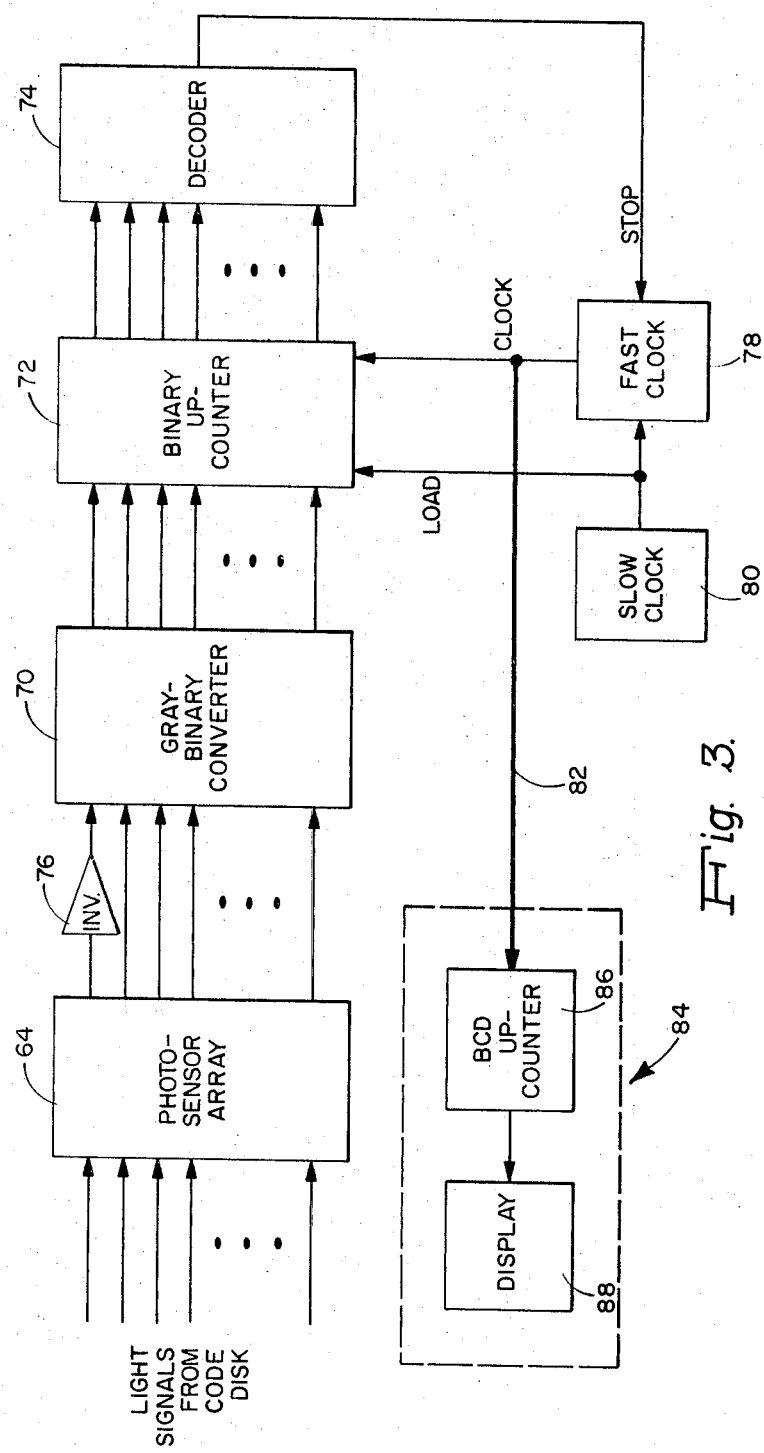
FIG. 3 is a block diagram representation of logic circuitry embodying the invention.

The logic circuitry of the invention is illustrated in FIG. 3 and is operative in response to light signals received from the code disk by photosensor array 64. The array provides a plurality of digital electrical signals, each of the digital signals representing a bit of a Gray-coded number, and each applied to a Gray-to-binary converter 70. The output signals of converter 70 are applied to a binary up-counter 72 which, in turn, has its output coupled to a decoder 74. The output of the photosensor array 64 which detects the most significant bit of the Gray code provided on the code disk, which in the illustrated embodiment is the innermost track, is applied to the Gray-to-binary code converter 70 by means of an inverter 76 operative to invert this most significant bit. The counter 72 is driven by a fast clock 78 which, in turn, is enabled by a slow clock 80. The output of decoder 74 is applied to the fast clock as a stop signal to discontinue the clocking operation thereof. The output of slow clock 80 is also employed as a load signal for enabling counter 72. A pulse train provided by fast clock 78 serves as the system output which is applied via a transmission line 82 to a receiver 84 including a binary coded decimal (BCD) up-counter 86, the output of which is applied to a suitable display 88, such as a multidigit numerical indicator for display of compass heading.

As discussed, a Gray-coded disk is employed of particular sequence to provide only one bit transition from each Gray-coded number to the next throughout the compass circle. In the illustrated embodiment, Gray code values corresponding to decimal numbers from 76 to 435 are employed. The Gray code equivalent of 76 represents a 0° heading while the Gray code equivalent of 435 represents a 359° heading. The provision of a code having only single bit transitions is advantageous in minimizing the ambiguous sensing of adjacent codes which can arise if the code disk is positioned with the linear photosensor array aligned between adjacent code positions, and, by virtue of the unique cyclical code, the ambiguity is limited to only a single bit or one degree.

The inversion of the most significant bit by inverter 76 provided the complement of the equivalent binary number. The signals applied to the converter 70 represent a Gray-coded number with a complemented most significant bit, while the signals provided as an output from converter 70 represent the binary number which is the complement of the equivalent binary number represented by the Gray-coded signal from the code disk. The Gray-to-binary converter is itself well known in the electronics art, a typical implementation being described in *Electronic Analog-to-Digital Conversion*, H. Schmid, Van Nostrand, Reinhold Co. (1970) pages 312–313.

The decimal equivalent of the coded input read from disk 18 added to the decimal equivalent of the coded output of converter 70 is equal to the decimal number 511. Employing this relationship, the relative values between the input Gray code and the binary code applied to counter 72 are readily determined. The reciprocal relationship between the input Gray code and the converted binary coded output of converter 70 offers particular advantages in terms of efficient and relatively simple logical processing. The reciprocal relationship of the codes allows the use of a unidirectional counter which is a less complex circuit than a reversible or bidirectional counter, which would otherwise be required. Also, the reciprocal code relationship permits the generation of a direct output representative of course position without additional conversions of the code.

The inversion of the most significant bit of the input Gray code can alternatively be provided by inversion of the code segments on the most significant bit track of the code disk rather than by an electronic inverter 76 in the associated logic circuitry. The result is of course the same; namely, inversion of the most significant bit of the code applied to converter 70.

In operation, the code disk will be in an angular position in accordance with the earth's magnetic field such that the photosensor array 64 is aligned with respect to the disk to provide a plurality of output signals representing the compass heading in Gray-coded form. These signals are applied to the Gray-to-binary converter 70 with the most significant bit thereof inverted by inverter 76 prior to its application to the converter. The binary coded output of converter 70 is applies to up-counter 72, which under the control of clock pulses provided by fast clock 78, causes the counter to be loaded with the number provided by converter 70 and to increment the counter to a predetermined final count which is then sensed and decoded by decoder 74.

In the implementation described, the counter operates to a final count which is the binary equivalent of decimal 436 which is detected by decoder 74 and which provides, upon such detection, a stop signal to fast clock 78 to discontinue its operation. The decoder 74 is typically a NAND gate for receiving the input signals representing the number to be decoded. The number of pulses provided by fast clock 78 to counter 72, which is also the output pulse train applied to utilization apparatus such as a course display, is equal to the difference between the initial and final counts of counter 72 and is also of a number one higher than the measured course in degrees.

The fast clock 78 provides a number of clock pulses $n$ to counter 72 which is equal to the difference between the initial count applied to the counter and the final count which is the binary equivalent of decimal 436. The clock train of $n$ pulses provided by the fast clock 78 serves as the system output and is applied to a BCD up-counter 86 which, in turn, drives a multidigit or other appropriate display of compass position. The BCD counter 86 in the illustrated embodiment is reset by the first pulse applied thereto and thus the train of $n$ pulses applied to counter 86 causes a count of $n-1$ pulses to be stored therein for display of the associated position. Thus, a number of output pulses is provided which is one more than the course position, since the first pulse is employed to reset the display counter.

The fast clock can be enabled to accomplish a compass reading by manual means or in the illustrated embodiment by a start signal from a slow clock 80 which is employed to determine the sampling rate at which the code disk is read and decoded for display of compass position. The slow clock can be free running or manually started to provide an output reading, and effectively provides a time delay between the sensing of the disk and the corresponding output display of sensed position. The display 88 typically includes a multidigit numerical display, such as a glow tube or segmented display, and associated BCD-to-numerical converters and amplifiers which are per se well known in the art. The receiver 84 is usually contained in a readout unit located remote from the compass structure of FIG. 1, and other like readout units or other apparatus can be provided at various positions on the ship, all driven by the same compass. Since only a single data line need be employed to transmit the encoded compass position, the interconnecting wiring to such remote units is relatively simple to implement.

In the illustrated embodiment output pulses are provided of a number one more than that representing the actual detected course, the initial pulse of the output train being employed to reset the display counter. It will be appreciated that the invention is useful with a variety of utilization apparatus which can include different types of numerical displays, automatic pilots and the like. If a reset pulse is not needed for particular purposes, the logic of decoded 74 is arranged to detect a final count which is the binary equivalent of decimal 435 to produce upon such detection, a stop signal to fast clock 78. As a result, an output pulse train is provided of a number which directly represents the sensed course.

Magnetic deviation correction can be provided by well known magnetic compensation techniques or can be provided electronically by the addition or subtraction of output pulses prior to their display. For example, pulses can be added or subtracted as required in display counter 86 to provide corrected course indication.

Figure 4A:
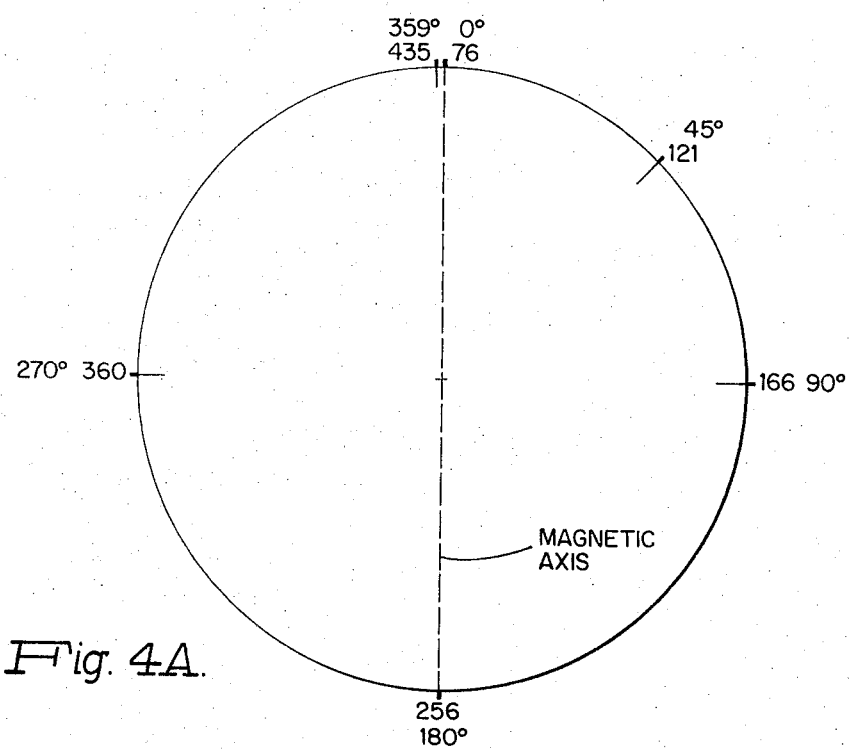
FIGS. 4A and 4B are diagrammatic representations of code disk useful in illustrating different embodiments of the invention.

The reciprocal relationship between the input Gray code and the converted binary output code can alternatively be provided by use of a Gray coded disk which is of opposite sense to that employed in the embodiment described above. As shown in FIG. 4A, the code disk employed in the above embodiment includes a clockwise sequence of Gray code values representing degree headings from 0° to 359°. The magnetic axis of the associated magnet is along the 0° to 180° diameter of the disk and the coded compass position as sensed by the photosensor array is a Gray coded representation of the actual compass heading. The 0° position is represented by the Gray code equivalent of decimal 76, while the 180° position is represented by the Gray code version of decimal 256.

Figure 4B:
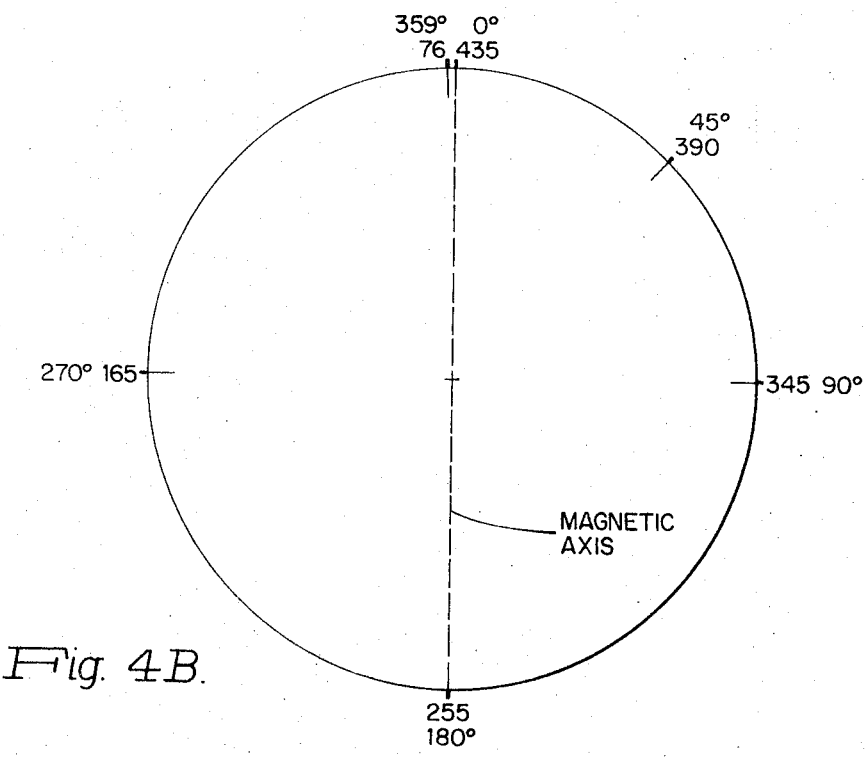

According to an alternative embodiment of the inversion, a code disk shown in FIG. 4B is employed having a counter-clockwise sequence of Gray coded values representing the compass headings. The magnetic axis of the associated magnet extends along the 0° to 180° diameter of the disk, which extends between the Gray code versions of decimal 435 and decimal 255. In this latter embodiment the compass position sensed by the photosensor array is a complementary coded representation of compass heading. The most significant bit of the code detected from the disk of FIG. 4B is not inverted, as the reciprocal relationship of the input and output codes is provided by the opposite code sequence employed. Processing of the data detected from the code disk is otherwise the same as described hereinabove.

As an example, in a clockwise coded disk (FIG. 4A), the Gray code representing a compass heading of 45° is the Gray code version of decimal 121 or 001000101. After inversion of the most significant bit, the code applied to converter 70 is 101000101. In the counter-clockwise coded disk (FIG. 4B), the Gray code sensed by the photosensor array which represents a compass heading of 45° is the Gray code version of decimal 390, which is 101000101. The most significant bit of this code is not inverted in this instance and this code is applied to converter 70. It is evident that the code applied to converter 70 is the same in either embodiment. The converted binary number provided by converter 70 to counter 72 is thus identical in either case and an output display of the same compass heading is provided, being 45° in the example discussed.

It will be appreciated that the invention is not limited to the particular implementations shown and described. For example, the compass rotor can be of forms other than a disk, such as a cylinder rotatable about its longitudinal axis and having code markings arranged around a cylindrical surface thereof for sensing and subsequent processing. In addition, the logic circuitry of the invention is not limited to use with magnetic compasses alone, but is more generally useful for the processing of digital signals provided by other types of angle encoders such as digital temperature and pressure instruments in which the angular position of a rotatable element is sensed. Accordingly, it is not intended to limit the invention by what has been particularly shown and described except as indicated in the appended claims.

What is claimed is:

1. A digital compass comprising:
    an optically sensible disk having a plurality of concentric tracks each with a different number of alternately light transmissive and opaque segments thereon defining a plurality of multiple bit Gray coded values around the periphery thereof representative of compass headings;
    means for mounting said disk rotation about an axis orthogonal to the plane of said disk;
    one or more magnets provided for rotation with said disk and operative to align said disk with respect to the earth's magnetic field;
    a light source for transmitting light through said plurality of tracks;
    a plurality of photosensors each operative to receive light from a respective track of said disk to produce a corresponding multiple bit digital signal representing a selected code sequence of Gray coded values which provide unambiguous transitions throughout the compass circle;
    logic circuitry operative in response to the plurality of digital signals provided by said photosensors to provide an output indication of compass position, said circuitry including:
    means for inverting the most significant bit of said digital signals corresponding to the most significant bit of said Gray code;
    Gray-to-binary converter means for converting said digital signals having said inverted most significant bit into output signals representing a binary code which is the complement of the binary equivalent of the Gray code sensed from said disk;
    a unidirectional binary counter receiving the binary output signals from said converter;
    a decoder coupled to the output of said counter and operative to provide an output signal in response to a predetermined count therefrom;
    clock means for providing serial clock pulses to increment said counter from the binary number entered therein from said Gray-to-binary converter means to a predetermined higher count at which said decoder is responsive;
    said decoder output signal being operative to interrupt the supply of clock pulses by said clock means; and
    the serial clock pulses provided by said clock means being of a number representative of the compass position sensed from said disk; and
    output means operative in response to said serial clock pulses for providing an output indication of compass position.

2. The invention according to claim 1 wherein said clock means includes:
    a fast clock operative at a predetermined rate for providing said clock pulses to said counter means and to said output means; and
    a slow clock operative at a predetermined lower rate than the rate of said fast clock and operative to control the sampling rate at which said digital signals are processed.

3. The invention according to claim 1 wherein said output means includes:
output counter means for receiving said clock pulses from said clock means and operative to increment to a corresponding count in response thereto; and display means operative in response to the count of said output counter means to provide a numerical indication of compass heading.

4. The invention according to claim 3 wherein said output means is remote from said logic circuitry and connected thereto by only a single signal channel operative to transmit said serial clock pulses.

5. The invention according to claim 1 wherein said digital signals represent a sequence of Gray coded values corresponding to decimal numbers from 76 to 435, the Gray coded equivalent of decimal 76 representing a compass heading of 0°, the Gray coded equivalent of decimal 435 representing a compass heading of 359°.

6. The invention according to claim 3 wherein:
said output counter means is operative to be reset by the first one of said clock pulses from said clock means;
and wherein said decoder is operative to provide an output signal to said clock means such that said clock pulses are of a number one more than the number directly representing compass position.

7. A digital compass comprising:
a compass rotor having a sensible code thereon defining a plurality of multiple bit Gray coded values representative of compass headings;
means for mounting said rotor for rotation about its axis;
one or more magnets provided for rotation with said rotor and operative to align said rotor with respect to the earth's magnetic field;
means for sensing the code on said compass rotor and for providing a plurality of multiple bit digital signals representative of compass heading, said digital signals representing a Gray code version of compass heading;
logic circuitry operative in response to said plurality of multiple bit digital signals to provide an output indication of compass position; said circuitry including:
means for inverting the most significant bit of said digital signals corresponding to the most significant bit of said Gray code;
converter means for converting said Gray coded digital signals having said inverted most significant bit into binary coded output signals;
a unidirectional binary counter receiving the binary coded output signals;
decoder means coupled to the output of said unidirectional counter means and operative to provide an output signal in response to a predetermined count therefrom; and
clock means for providing serial clock pulses to increment said unidirectional counter means from the binary number entered therein from said converter means to a predetermined higher count at which said decoder is responsive;

said decoder output signal being operative to interrupt the supply of clock pulses by said clock means;

the serial clock pulses provided by said clock means being of a number representative of the compass position sensed from said compass rotor.

8. A digital compass comprising:
an optically sensible code disk having a plurality of concentric tracks each with a different number of alternately light transmissive and opaque segments thereon defining a plurality of multiple bit Gray coded values around the periphery thereof representative of compass headings;
means for mounting said disk for rotation about an axis orthogonal to the plane of said disk;
one or more magnets provided for rotation with said disk and operative to align said disk with respect to the earth's magnetic field;
a light source for transmitting light through said plurality of tracks;
a plurality of photosensors each operative to receive light from a respective track of said disk to produce a corresponding digital signal representing a selected code sequence of Gray coded values which provide unambiguous transitions throughout the compass circle;
logic circuitry operative in response to the plurality of digital signals provided by said photosensors to provide an output indication of compass position, said circuitry including:
Gray-to-binary converter means for converting said digital signals into output signals representing a binary code which is the complement of the binary equivalent of the Gray code sensed from said disk;
a unidirectional binary counter receiving the binary output signals from said converter;
a decoder coupled to the output of said counter and operative to provide an output signal in response to a predetermined count therefrom;
clock means for providing serial clock pulses to increment said counter from the binary number entered therein from said Gray-to-binary converter means to a predetermined higher count at which said decoder is responsive;
said decoder output signal being operative to interrupt the supply of clock pulses by said clock means;
the serial clock pulses provided by said clock means being of a number representative of the compass position sensed from said disk; and
output means including at least one output terminal operative in response to said clock pulses for providing an output indication of compass position, said at least one output terminal being disposed at a location remote from said logic circuitry and connected thereto by only a single signal channel operative to transmit said serial clock pulses.

9. The invention according to claim 8 wherein said converter means includes:
a Gray-to-binary converter; and
means for inverting the digital signal representing the most significant bit of said Gray code prior to application of said bit to said Gray-to-binary converter.

10. The invention according to claim 8 wherein said clock means includes:
  a fast clock operative at a predetermined rate for providing said clock pulses to said counter means and to said output means; and
  a slow clock operative at a predetermined lower rate than the rate of said fast clock and operative to control the sampling rate at which said digital signals are processed.

11. The invention according to claim 8 wherein said output means includes:
  output counter means for receiving said clock pulses from said clock means and operative to increment to a corresponding count in response thereto; and display means operative in response to the count of said output counter means to provide a numerical indication of compass heading.

12. The invention according to claim 8 wherein said code disk has said Gray codes arranged in a counter-clockwise sequence around said disk and representing a complement of corresponding compass headings.

* * * * *